United States Patent [19]

Iwabe et al.

[11] Patent Number: 5,068,718
[45] Date of Patent: Nov. 26, 1991

[54] IMAGE QUALITY CORRECTING SYSTEM FOR USE WITH AN IMAGING APPARATUS

[75] Inventors: Kazuki Iwabe, Tokyo; Naoki Kubo, Kanagawa; Hiroshi Tamayama, Kanagawa; Takashi Yano, Kanagawa; Takashi Soga; Hitoshi Koike, both of Tokyo, all of Japan

[73] Assignee: Fuji Photo Film Co., Ltd., Kanagawa, Japan

[21] Appl. No.: 496,331

[22] Filed: Mar. 20, 1990

Related U.S. Application Data

[63] Continuation-in-part of Ser. No. 431,076, Nov. 3, 1989, abandoned.

[30] Foreign Application Priority Data

Nov. 4, 1988 [JP] Japan ................................. 1-277507
Nov. 21, 1988 [JP] Japan ................................. 1-292285
Nov. 21, 1988 [JP] Japan ................................. 1-292286

[51] Int. Cl.⁵ .............................................. H04N 9/69
[52] U.S. Cl. ........................................ 358/27; 358/32; 358/39; 358/164

[58] Field of Search ............... 358/32, 39, 27, 164, 358/168, 169

[56] References Cited

U.S. PATENT DOCUMENTS

| | | | |
|---|---|---|---|
| 3,684,825 | 8/1972 | Dischert et al. | 358/32 |
| 3,752,905 | 8/1973 | Schneider | 358/164 |
| 4,152,720 | 5/1979 | Fenton | 358/27 |
| 4,241,362 | 12/1980 | Van der Valk | 358/164 |
| 4,305,090 | 12/1981 | Hess et al. | 358/27 |
| 4,489,349 | 12/1984 | Okada | 358/164 |
| 4,812,903 | 3/1989 | Wagensonner et al. | 358/40 |

Primary Examiner—John W. Shepperd

[57] ABSTRACT

An image quality correction circuit for use with an imaging apparatus which converts a luminance signal so that an intermediate portion of the signal between preset minimum and maximum values is extended. The invention also relates to a device where color difference signals are corrected in accordance with the same non-linear characteristic utilized in the correction of the luminance signal.

18 Claims, 10 Drawing Sheets

IMAGE QUALITY CORRECTING SYSTEM FOR USE WITH AN IMAGING APPARATUS

This application is a continuation-in-part of application Ser. No. 07/431,076 now abandoned, filed on Nov. 3, 1989.

FIELD OF THE INVENTION

The present invention relates to an imaging apparatus such as an electronic camera. More particularly, the present invention relates to an image quality correcting system for taking a good picture of a subject and its background even under a backlighted condition where the subject is comparatively darker than its surroundings or with a spotlighted scene where the subject is comparatively brighter than its surroundings.

DESCRIPTION OF BACKGROUND ART

Figure 1:
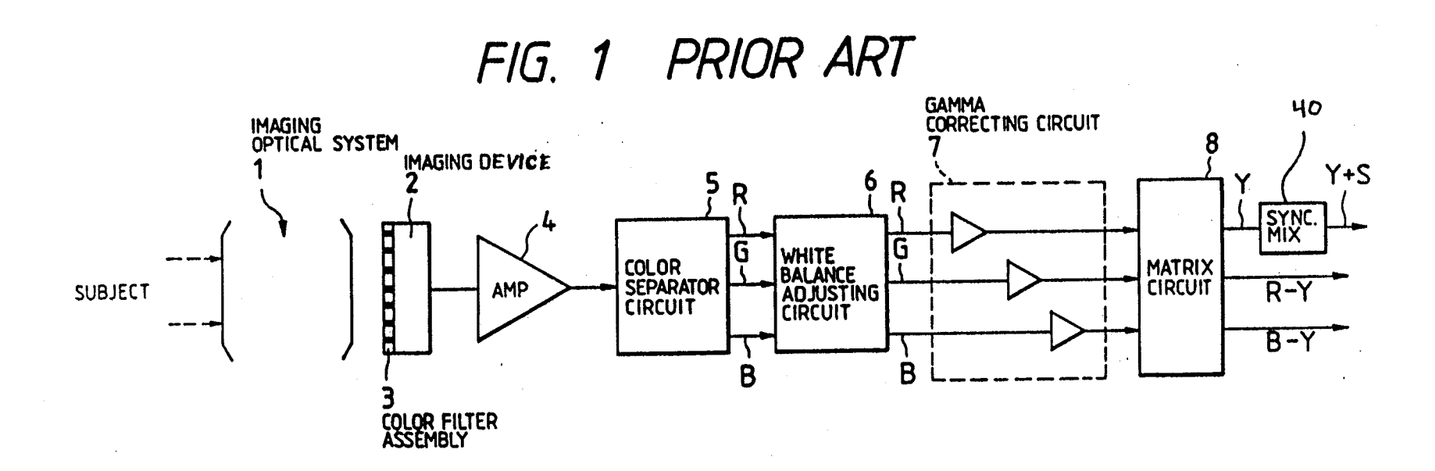
FIG. 1 is a block diagram showing the construction of an imaging apparatus used in a prior art image quality correcting system.

Conventional imaging apparatuses such as electronic still cameras and video tape recorders (VTRs) utilize an imaging system such as that shown in FIG. 1. Briefly, the system comprises an imaging optical system 1 composed of an imaging lens, a diaphragm stop, a shutter, etc.; an imaging device 2, such as a charge-storage solid-state imaging device (CCD) placed behind the imaging optical system 1; and a color filter assembly 3 provided on the light-receiving surface of the imaging device 2 which consists of a red (R), a green (G) and a blue (B) filter typically associated with pixels. The imaging device 2 performs photoelectric conversion of the optical image of the subject and then reads information by "horizontal" and "vertical" scanning to produce a video signal generated for each pixel on a real time basis. The output video signal is then amplified by a preamplifier 4 to an amplitude level which allows for signal processing.

The video signal produced on a real time basis output from the preamplifier 4 is fed into a color separator circuit 5 where it is separated into three color signals of red (R), green (G) and blue (B). The color signals are then fed into a white balance adjusting circuit 6 and the amplitude levels are adjusted in such a way that an optimal white color is obtained when an image is reproduced from the color signals. The color signals produced from the white balance adjusting circuit 6 are passed through a gamma-correcting circuit 7 which corrects for the tonal characteristics of a CRT and are thence supplied to a matrix circuit 8 where they are converted to a luminance signal Y and color difference signals R-Y and B-Y. Luminance signal Y is subsequently delivered to sync mix circuit 40 to thereby produce output signal Y+S which contains sync information. These signals Y+S, R-Y and B-Y can be recorded on a magnetic recording medium, supplied to a video reproducing monitor television or used in other applications.

The imaging apparatus described above has an automatic exposing (AE) capability by which the aperture or shutter speed is controlled in such a way that the exposure amount is automatically adjusted to ensure optical setting of the quantity of light incident upon the apparatus. The AE process comprises the steps of detecting the intensity of light received from a subject subtended by a given angle of viewing and then automatically controlling the aperture or shutter speed to enable imaging under optimal conditions for the photoelectric conversion characteristics of the imaging device.

Figure 2:
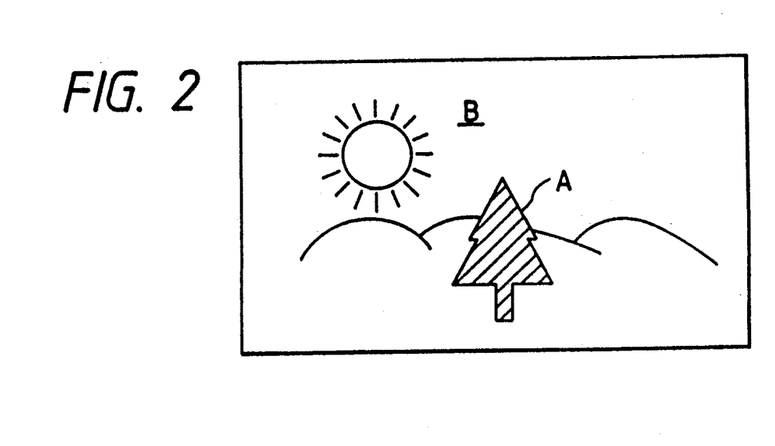
FIG. 2 is an illustration useful in the understanding of the problem solved in the present invention.

Even if such AE capability is built into the imaging apparatus, satisfactory results are not always attained. For example, if a dark subject of interest A to be imaged is located in a brighter background scene B, such as shown in FIG. 2, the darker subject of interest A will be reproduced as an obscure image due to contrasting brightness. Similarly, if a picture is taken with an increased amount of light reception from the subject of interest A, the background scene B will become dead white. Conversely, if the subject of interest is a person in white clothes standing in a dark background, the clothing will appear extremely bright and as a result, difficult to perceive.

SUMMARY OF THE INVENTION

In order to solve the aforementioned problems of the prior art, the principal object of the present invention is to provide an image quality correcting system for use with an imaging apparatus which is capable of sharply imaging two subjects of different brightness levels which are subtended by the same angle of viewing.

In a first embodiment of the present invention, a luminance signal formed in a matrix circuit is subjected to nonlinear processing in which a luminance level intermediate between preset minimum and maximum luminance levels is extended. As a result, the luminance of a subject with low illumination intensity is sufficiently emphasized to enable its satisfactory imaging. On the other hand, the luminance of both the darkest and lightest areas is retained so that the black areas will remain black and the white areas will remain white. Image deterioration, typically caused by whitening of a black area or disappearance of comparatively bright areas, is therefore suppressed. Additionally, the system of the present invention does not introduce disturbances into the white balance adjustment operation, and as a result, further contributes to the reproduction of a sharp image.

In a further embodiment, the extended intermediate luminance signal between the preset minimum and maximum luminance levels is obtained by a correcting means which has an input/output characteristic extending along an approximation curve which has at least one kinking point. The amplification factor and/or the position of the kinking point may be appropriately changed to provide a new luminance signal having a non-linear characteristic. This further embodiment offers the advantage of a practical circuit configuration of great simplicity which contributes to the fabrication of a compact system of integrated semiconductor circuit technology.

In a still further embodiment of the present invention, a color difference correcting circuit is utilized to amplify the color difference signals by an appropriate amplification factor. The color difference signals are subject to correction for signal extension and this results in the suppression of unwanted phenomena such as the whitening of hues that would otherwise occur upon an increase in the amplitude of the luminance signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 3:
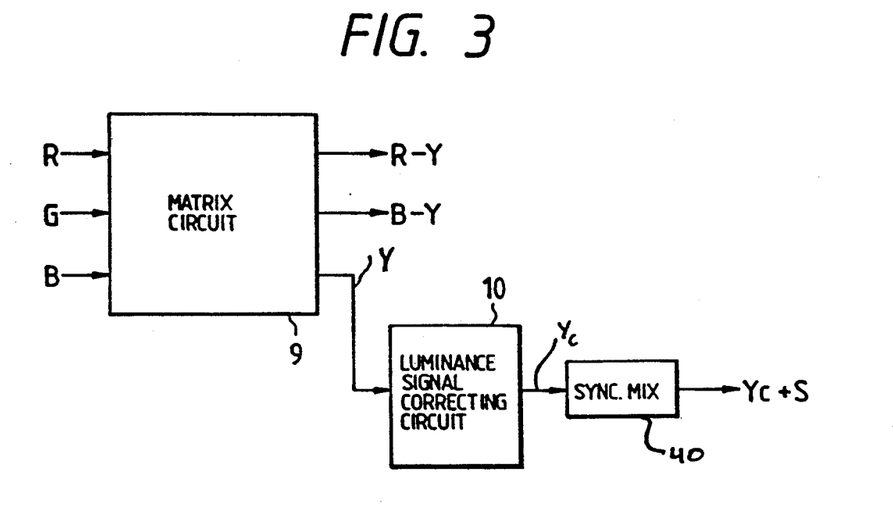
FIG. 3 is a schematic diagram illustrating the basic construction of a first embodiment of the present invention.
Figure 4:
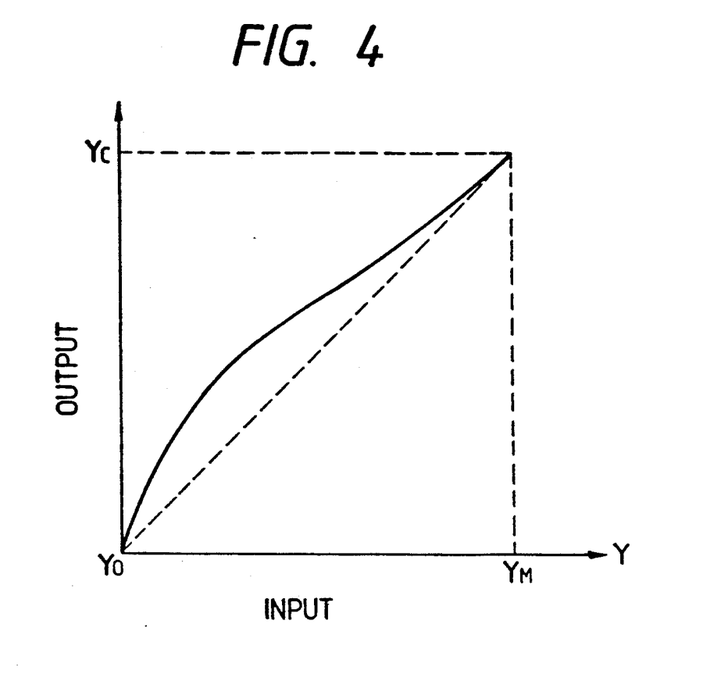
FIG. 4 is a graph illustrating the operating principle of the system of FIG. 3.

FIG. 3 is a schematic diagram illustrating the basic construction of a first embodiment of the system of the present invention and FIG. 4 illustrates the operating principle of the system in graphic form. As shown in FIG. 3, separated color signals, R (red), G (green) and B (blue), are converted to color difference signals R-Y and B-Y and luminance signal Y in a conventional matrix circuit 9. The luminance signal Y is then delivered to a luminance signal correcting circuit 10 which has an input-output characteristic as shown in FIG. 4 and which generates a new luminance signal Yc. The luminance signal Yc is thereafter passed through sync mix circuit 40 to produce the resulting luminance signal Yc+S which is used together with the color difference signals R-Y and B-Y as signals for image reproduction. As FIG. 4, illustrates the luminance signal correcting circuit 10 operates over a range between a preset minimum luminance $Y_0$, corresponding to the darkest state, and a preset maximum luminance $Y_M$, corresponding to the lightest state. The luminance correcting circuit will output a new luminance signal Yc with the same linear amplification factor in response to luminance signal inputs for both the minimum luminance $Y_0$ and maximum luminance $Y_M$. The luminance correction circuit will output a new luminance signal Yc in accordance with a preset characteristic nonlinear amplification factor in response to a luminance signal input between minimum luminance $Y_0$ and maximum luminance $Y_M$. This nonlinear amplification factor is set at a higher value than the linear amplification factor of the minimum luminance $Y_0$ and maximum luminance $Y_M$ so as to extend an intermediate luminance signal.

The above described embodiment of the present invention as pertaining to FIGS. 3 and 4, extends a luminance level intermediate between minimum and maximum luminance levels so that the luminance of a subject with low illumination intensity is sufficiently emphasized to enable its satisfactory imaging. On the other hand, the luminance of both the darkest and lightest areas is retained so that the black area will remain black and the white area will remain white, thereby suppressing image deterioration typically caused by whitening of the black area or disappearance of comparatively bright areas. Further, the system processes only luminance signals so that it will not upset the desired white balance.

Figure 5:
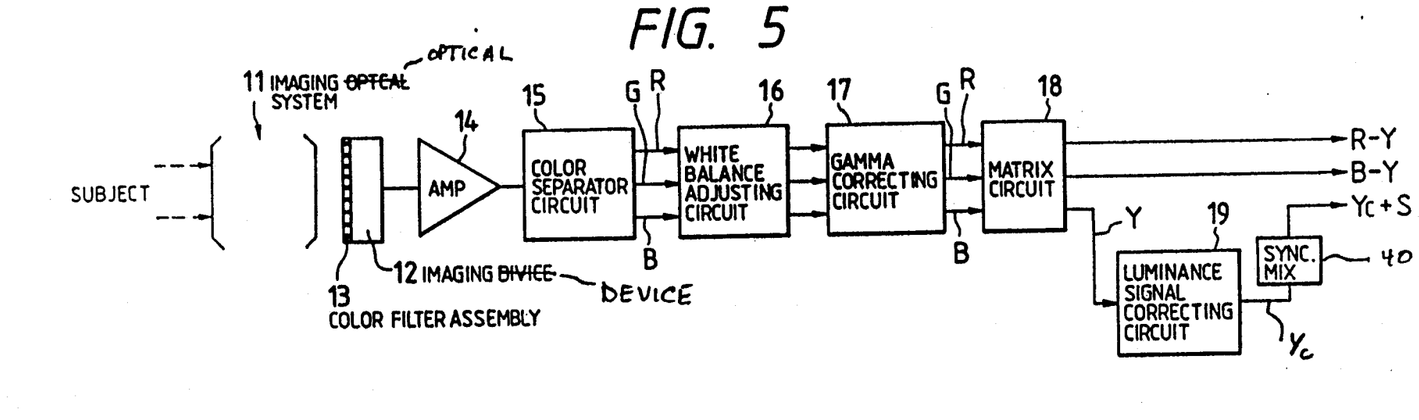
FIG. 5 is a schematic diagram illustrating an imaging apparatus incorporating the first embodiment of the present invention.

FIG. 5 illustrates the construction of an imaging system as applied to an electronic still camera or VTR which embodies the luminance signal correcting circuit described above. As shown, the system comprises an imaging optical system 11 composed of an imaging lens, a diaphragm stop, a shutter, etc.; an imaging device 12, such as a charge-storage solid-state imaging device (CCD), placed behind the imaging optical system 11; and a color filter assembly 13 provided on the light-receiving surface of the imaging device 12 which consists of a red (R), a green (G) and a blue (B) filter typically associated with pixels. The imaging device 12 performs photoelectric conversion of the optical image of the subject and then reads information by "horizontal" and "vertical" scanning to produce a video signal generated for each pixel on a real time basis. The output video signal is then amplified by a preamplifier 14 to an amplitude level which allows for signal processing.

The video signal produced on a real time basis output from the preamplifier 14 is fed into a color separator circuit 15 where it is separated into three color signals of red (R), green (G) and blue (B). The color signals are then fed into a white balance adjusting circuit 16 and the amplitude levels are adjusted in such a way that an optical white color is obtained when an image is reproduced from the color signals. The color signals produced from the white balance adjusting circuit 16 are passed through a gamma-correcting circuit 17 which corrects for the tonal characteristics of a CRT and are thence supplied to a matrix circuit 18 where they are converted to a luminance signal Y and color difference signals R-Y and B-Y.

Figure 6:
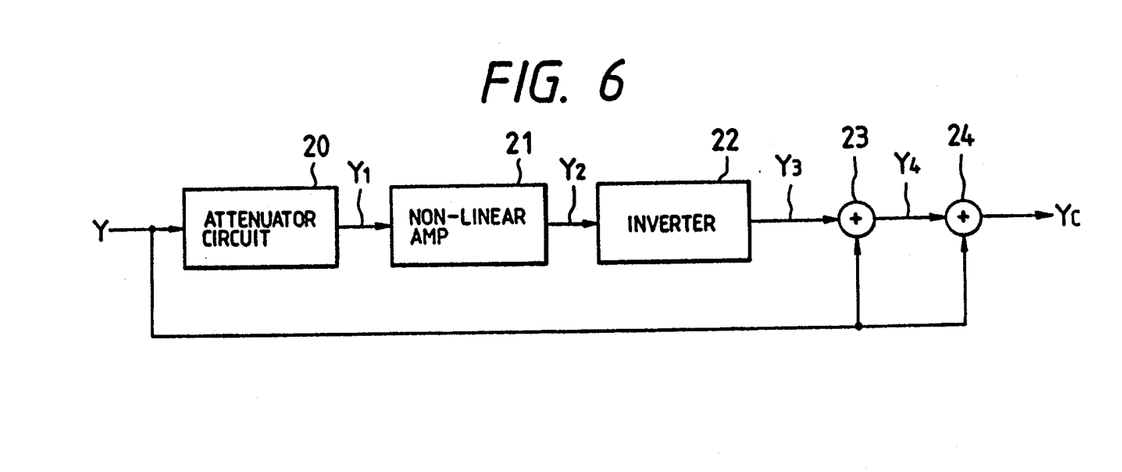
FIG. 6 is a block diagram illustrating the construction of the luminance signal correction circuit used in the system of FIG. 5.

The system shown in FIG. 5 also includes a luminance signal correcting circuit 19 which is supplied with the luminance signal Y and which processes it in an internal nonlinear circuit to generate a new luminance signal Yc. The construction of this nonlinear circuit is shown in FIG. 6 and is seen to include an attenuator circuit 20 for attenuating the amplitude of luminance signal Y by a predetermined factor of $1/k_1$, a nonlinear amplifier circuit 21 for amplifying the attenuated signal by a preset nonlinear amplification factor, and an inverter circuit 22 for inverting the signal output from the nonlinear amplifier circuit 21. The nonlinear amplifier circuit 21 has such a nonlinear input-output characteristic that it amplifies signals for the minimum and maximum luminance levels by a factor of $k_1$ (the reciprocal of attenuation factor) and it amplifies a signal in the range between the minimum and maximum luminance levels by a factor smaller than $k_1$. The nonlinear characteristic of circuit 21 may be approximated by a known gamma-characteristic curve where the gamma value is greater than unity. Alternatively, a characteristic curve detected empirically under many various imaging conditions may be employed.

The nonlinear circuit further includes adder circuits 23 and 24. The adder circuit 23 adds luminance signal Y to signal $Y_3$ delivered from the inverter circuit 22 to form signal $Y_4$, and the adder circuit 24 adds this signal $Y_4$ to luminance signal Y to generate a new luminance signal Yc. The luminance signal Yc is thereafter supplied to sync mix circuit 40 which outputs the Yc+S luminance signal.

Figure 7A:
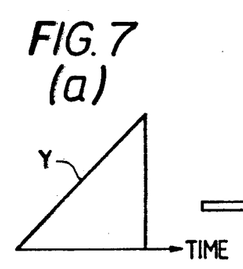
FIGS. 7(a)–(f) illustrate the sequence of operations performed in the luminance signal correcting circuit.
Figure 7B:
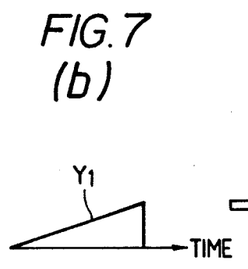
Figure 7C:
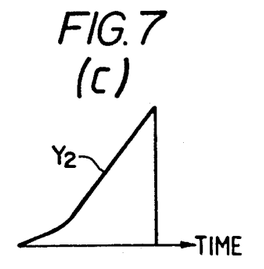

The luminance signal correcting circuit 19 is described hereinafter with reference to FIG. 7. Luminance signal Y which may have the waveform shown in FIG. 7(a), is converted by the factor $1/k_1$ in attenuator circuit 20 to form signal $Y_1$, shown in FIG. 7(b). Signal $Y_1$ is then amplified nonlinearly in the nonlinear amplifier circuit 21 to form signal $Y_2$, as shown in FIG. 7(c). In the nonlinear amplifier circuit 21, the amplitudes of signal $Y_2$ which correspond to the minimum and maximum luminance levels are restored to the amplitude levels which are equal to the minimum and maximum luminance levels of the initial luminance signal Y, whereas luminance signals between the minimum and maximum luminance levels are attenuated nonlinearly to provide the waveform shown in FIG. 7(c).

Figure 7D:
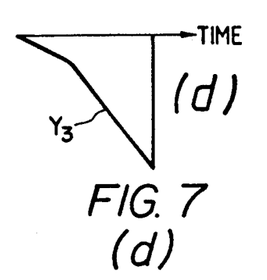
Figure 7E:
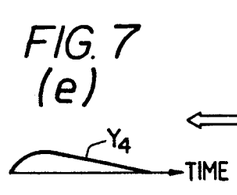
Figure 7F:
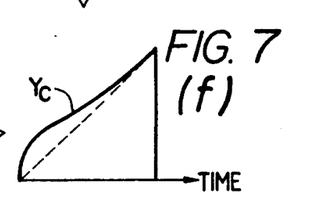

Signal $Y_2$ has its polarity inverted in the inverter circuit 22 to form signal $Y_3$, having the waveform shown in FIG. 7(d). The thus formed signal $Y_3$ is added to the initial luminance signal Y+S in the adder circuit 23 to form signal $Y_4$ which represents only the nonlinearly amplified portion, as shown in FIG. 7(e). Signal $Y_4$ is then added to the initial luminance signal Y in the adder circuit 24 to form a new luminance signal Yc, having the waveform shown in FIG. 7(f). This new luminance signal Yc is equivalent to the signal formed by the nonlinear input-output characteristic shown in FIG. 4.

Thus, according to the embodiment described above, the luminance signal formed by the matrix circuit is processed in the luminance signal correcting circuit which has a predetermined nonlinear input-output characteristic, and the processing in this circuit is performed in such a way that the intermediate luminance level is emphasized while variations that would otherwise occur in the luminance levels of the black and white areas are restricted. As a result, the above embodiment of the present invention ensures that a good picture of a scene can be taken with satisfactory image quality of the principal subject and the background irrespective of whether the scene of interest is backlighted or spotlighted.

Figure 8:
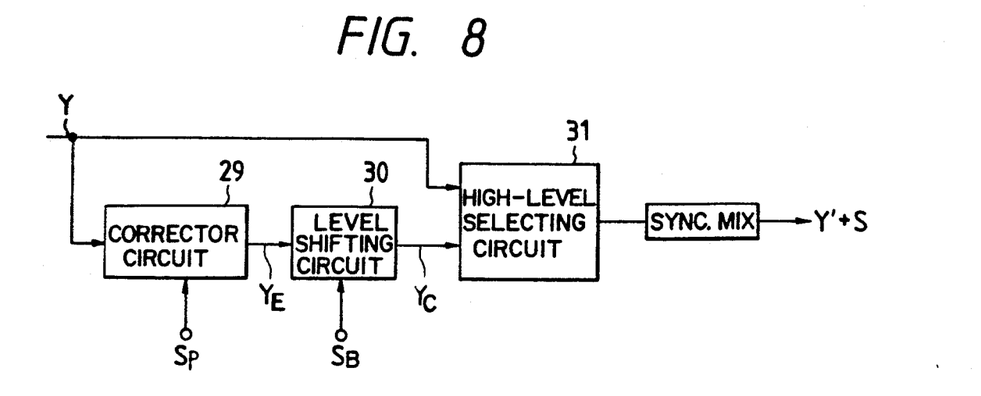
FIG. 8 is a schematic diagram illustrating the basic construction of a second embodiment of the present invention.
Figure 9:
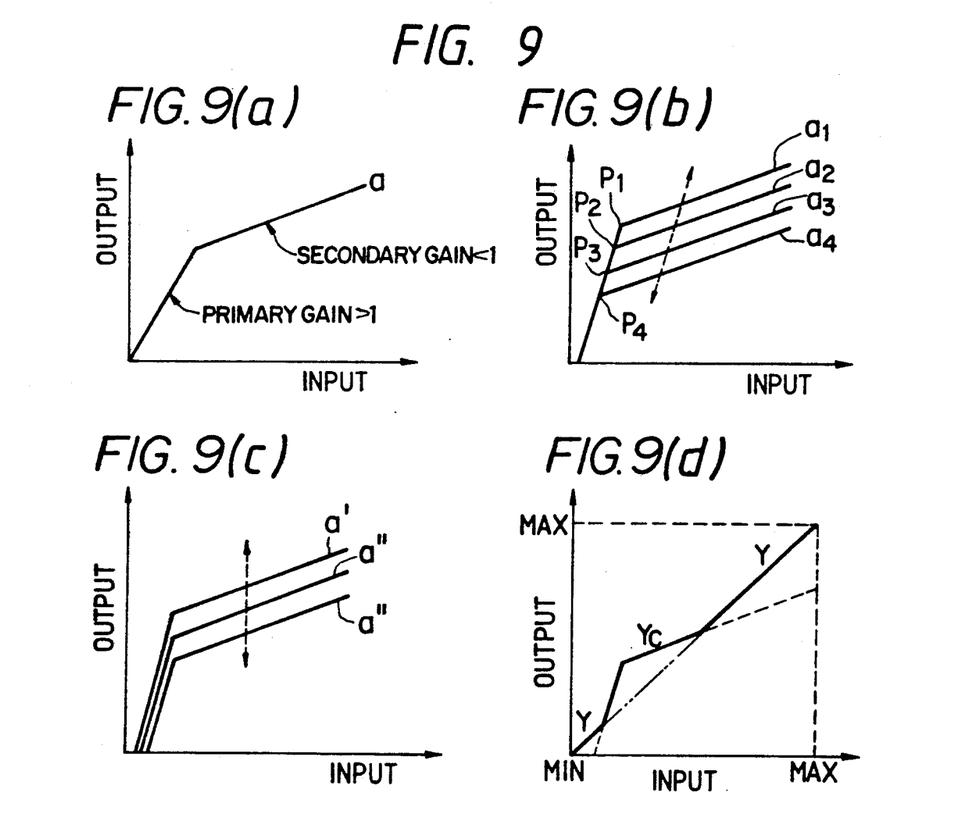
FIGS. 9(a)–(d) illustrate graphically the operating principle of the embodiment of FIG. 8.

A second embodiment of the luminance signal correction circuit of the present invention is shown in FIGS. 8 and 9 where FIG. 8 illustrates a schematic diagram of the system while FIG. 9 illustrates the operating principles of the system. As shown in FIG. 8, the system comprises a corrector circuit 29 which is supplied with luminance signal Y, a level shifting circuit 30 which adjusts the dc bias of a signal produced from corrector circuit 29, a high-level selecting circuit 31 that compares signal Yc produced from the level shifting circuit 30 with luminance signal Y and which selectively produces as an output the signal of higher dc level at each input time, and sync mix circuit 40 which delivers luminance signal Y'+S.

Corrector circuit 29 is capable of changing the kinking point of each input-output characteristic curve in response to the change of control signal Sp. When the control signal Sp is changed, corrector circuit 29 changes the position of the kinking point of the input-output characteristic a of FIG. 9(a), as indicated by $P_1$, $P_2$, $P_3$, and $P_4$ of FIG. 9(b), and changes the input-output characteristic (amplification factor) above each kinking point as indicated by $a_1$, $a_2$, $a_3$, and $a_4$ (i.e., in the direction indicated by the dashed line), and does so without changing the linearity of the input-output characteristic below each kinking point. Level shifting circuit 30 receives signal $Y_E$ from the corrector circuit 29 and changes the dc bias point of the signal $Y_E$ in response to control signal $S_B$. For example, the input-output characteristic curve $a_1$ of FIG. 9(b) is capable of being shifted by the level shifting circuit 30 to the overall output levels of the characteristic as indicated by a', a'', and a''', as shown in FIG. 9(c).

High-level selecting circuit 31 receives both luminance signal Y and the new luminance signal Yc generated by the processing in corrector circuit 29 and level shifting circuit 30, compares the two signals, and outputs the signal Yc or Y according to whichever has the higher level. As a result, signal Y' output from the high-level selecting circuit 31 is changed with respect to luminance signal Y in accordance with the input-output characteristic shown in FIG. 9(d). Stated more specifically, if the amplitude level of luminance signal Y is below a certain value or above another threshold value, the relationship between signal Yc and luminance signal Y is expressed by Y≧Yc, so that high-level selecting circuit 31 will selectively output luminance signal Y as shown in FIG. 9(d). If the amplitude level of luminance signal Y is within the range between the two threshold values, the relationship between Yc and Y is expressed by Y<Yc and signal Yc will be selectively produced from the circuit 31. Thus, the new luminance signal Y' is a composite signal obtained by superposing signal Yc on luminance signal Y under the respective conditions described above. The amplitude of the output luminance signal Y' varies between a predetermined upper limit (corresponding to maximum luminance MAX) and lower limit (corresponding to minimum luminance MIN) and circuits 29, 30 and 31 are so designed as to generate luminance signal Y' within these limits.

Figure 10:
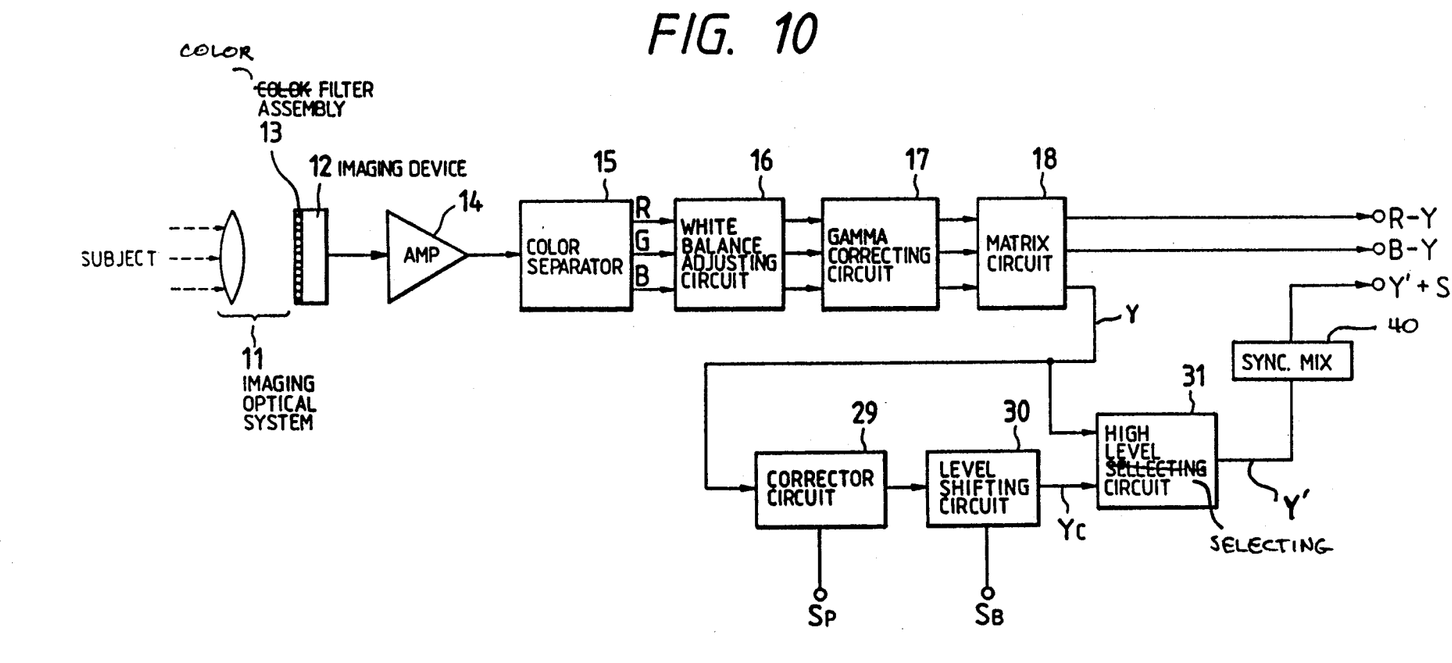
FIG. 10 is a schematic diagram illustrating an imaging apparatus incorporating the embodiment of FIG. 8.

FIG. 10 illustrates the construction of an imaging system for use in an electronic still camera, VTR or the like which utilizes the luminance signal correction circuit of the second embodiment. For the sake of brevity, the consideration of like elements corresponding to those previously discussed with reference to FIG. 5 will be omitted. As shown in FIG. 10, the corrected luminance signal Y' is produced after processing in a luminance signal correcting circuit of the same type as shown in FIG. 8. This circuit is shown in FIG. 10 and comprises a corrector circuit 29 which is supplied with luminance signal Y, a level shifting circuit 30 which adjusts the dc bias of the signal produced from the corrector circuit 29, and a high-level selecting circuit 31 that compares signal Yc produced from the level shifting circuit 30 with luminance signal Y and which selectively produces the signal of the higher dc level as an output at each input time.

The corrector circuit 29 is an analog circuit that is designed by an analog transistor fabrication technique to provide an input-output characteristic which has a kinking point as described in connection with the operating theory of the present invention. The level shifting circuit 30 is an analog circuit that varies the dc bias of the signal output the corrector circuit 29 in accordance with the dc voltage of control signal $S_B$. The high-level selecting circuit 31 basically comprises an analog comparator circuit which compares the amplitude levels of the signal Yc and the luminance signal Y, and a discriminator circuit.

Figure 11A:
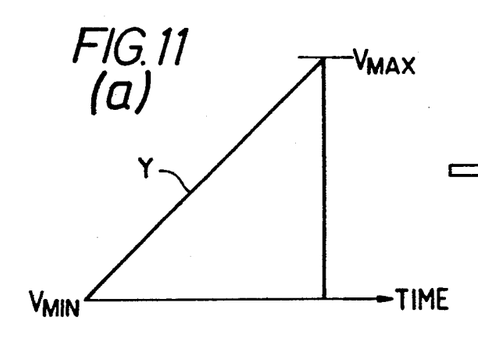
FIGS. 11(a)–(c) illustrate the sequence of operations performed in the embodiment of FIG. 10.
Figure 11B:
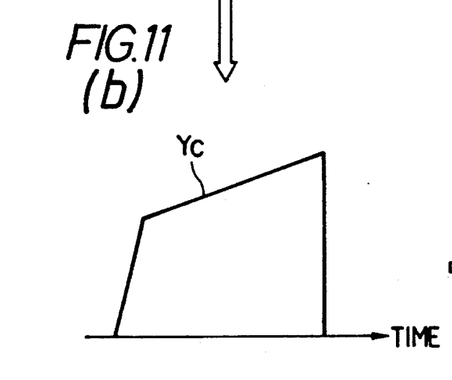
Figure 11C:
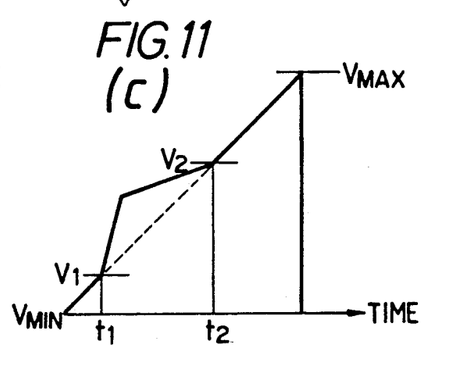

The embodiment under consideration will operate in the manner described below, with particular reference being made to a luminance signal Y that varies from a minimum value ($V_{MIN}$) to a maximum value ($V_{MAX}$) as shown in FIG. 11(a). First, luminance signal Y is converted nonlinearly to signal Yc as shown in FIG. 11(b) in accordance with the input-output characteristics of corrector circuit 29 and level shifting circuit 30, which are designated by respective control signals $S_p$ and $S_B$. Upon receiving signal Yc and luminance signal Y, the high-level selecting circuit 31 produces a new luminance signal Y' in such a way that the signal Yc appears as the output Y' during the time period $t_1$-$t_2$ where $Y_c \geq Y$, and whereas luminance signal Y appears as the output Y' otherwise, as shown in FIG. 11(c). The corrected luminance signal is therefore realized with an extended intermediate portion between the maximum and minimum luminance values in a manner similar to that of the first embodiment of the invention.

Figure 12:
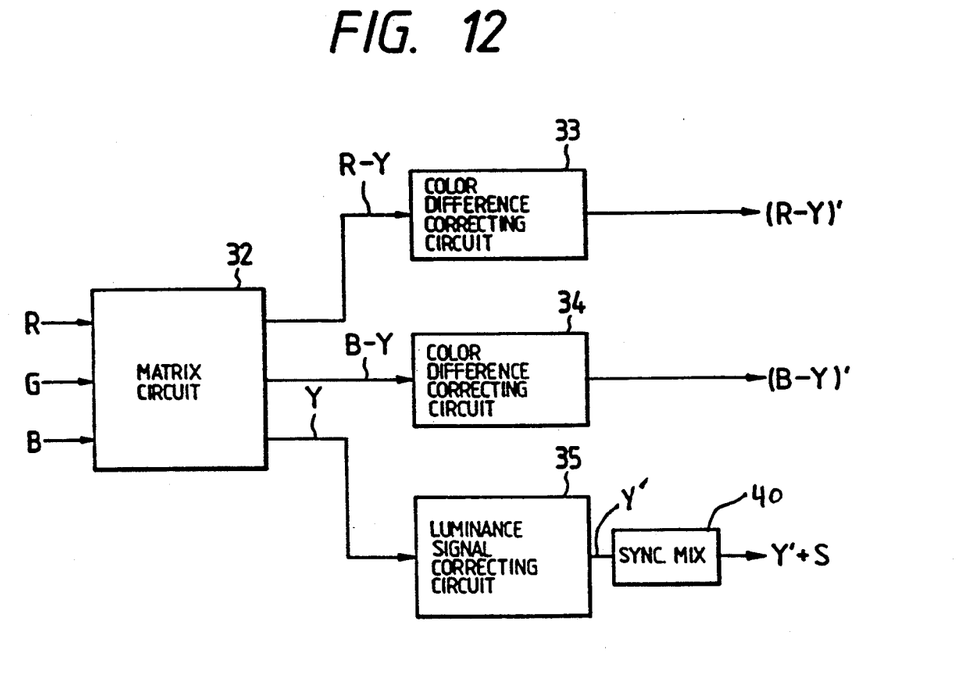
FIG. 12 is a schematic diagram illustrating the basic construction of a third embodiment of the present invention.

FIG. 12 is a schematic diagram illustrating the basic construction of the system of a third embodiment of the present invention with an operating principle as is illustrated in graphic form in FIG. 4. As shown in FIG. 12, separated color signals R (red), G (green) and B (blue), which may be signals for colors complementary to R, G and B, are converted into color difference signals R-Y and B-Y and a luminance signal Y in a conventional matrix circuit 32. The luminance signal Y is then passed through a luminance correcting circuit 35, similar to either of the previous embodiments, which has an input-output characteristic as shown in FIG. 4 and which generates a new luminance signal Y'. The luminance signal Y' is delivered to sync mix circuit 40 which outputs luminance signal Y'+S. Further, color difference signals R-Y and B-Y are extended in color difference correcting circuits 33 and 34 having appropriate fixed amplification factors in order to generate new color difference signals (R-Y)' and (B-Y)'. The resulting luminance signal Y'+S and color difference signals (R-Y)' and (B-Y)' are used as signals for image reproduction. As shown in FIG. 4 and similar to the previous embodiments, the luminance correcting circuit 35 operates over a range between a preset minimum luminance $Y_0$, corresponding to the darkest state, and a preset maximum luminance $Y_M$, corresponding to the lightest state. The luminance correcting circuit 35 will output a new luminance signal Y' with the same linear amplification factor in response to luminance signal inputs for both the minimum luminance $Y_0$ and maximum luminance $Y_M$. The luminance correction circuit will output a new luminance signal Y' in response to a luminance signal between minimum luminance $Y_0$ and maximum luminance $Y_M$. This nonlinear amplification factor is set at a higher value than the linear amplification factor of the minimum luminance $Y_0$ and maximum luminance $Y_M$ so as to extend an intermediate luminance signal.

In the third embodiment, the luminance signal is not the sole signal that is corrected. The color difference signals are subjected to correction for signal extension and this is effective in suppressing such unwanted phenomena as the whitening of hues that would otherwise occur upon increase of the amplitude of the luminance signal. Further, the color difference signals are corrected together with the luminance signal so that the chroma and lightness of each color are maintained at satisfactory levels.

A further embodiment of the present invention is hereunder described with reference to FIGS. 13 and 14. This embodiment is different from the previous embodiment in that a variable gain amplifier is used as each of the color difference correcting circuits 33 and 34 shown in FIG. 12. The amplifiers 33 and 34 shown in FIG. 12 have fixed amplification factors. In the presently considered embodiment, color difference signals R-Y and B-Y are nonlinearly amplified simultaneously with the nonlinear amplification that is performed on luminance signal Y by the luminance correcting circuit 35. The nonlinear amplification of the color difference signals is not effected at any other time.

Figure 13:
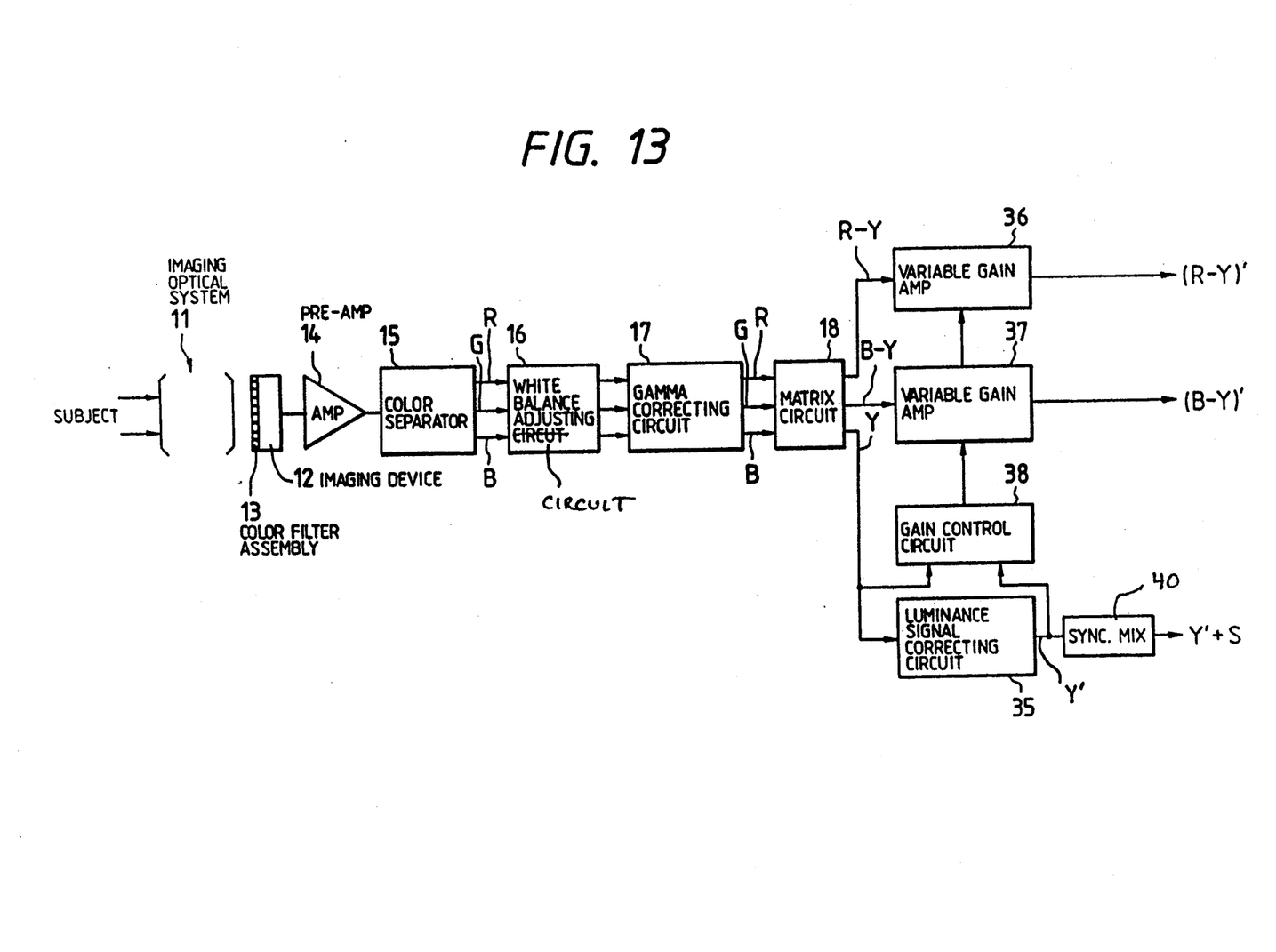
FIG. 13 is a schematic diagram illustrating an imaging apparatus incorporating a further embodiment of the present invention.

In FIG. 13, which illustrates the system configuration of the presently considered embodiment, the components which are the same as or equivalent to those shown in previous figures are identified by like numerals and discussion thereof is omitted for the sake of brevity. Luminance signal Y is supplied to the luminance correcting circuit 35, and color difference signals R-Y and B-Y are fed to associated variable amplifiers 36 and 37. A gain control circuit 38 is provided to detect the time at which luminance correcting circuit 35 performs nonlinear amplification on luminance signal Y, so that variable amplifiers 36 and 37 can be controlled to effect nonlinear amplification at that time. Thus, variable amplifiers 36 and 37 amplify the color difference signals in synchronism with the time period of nonlinear amplification shown in FIG. 4 or FIG. 9(d).

Figure 14:
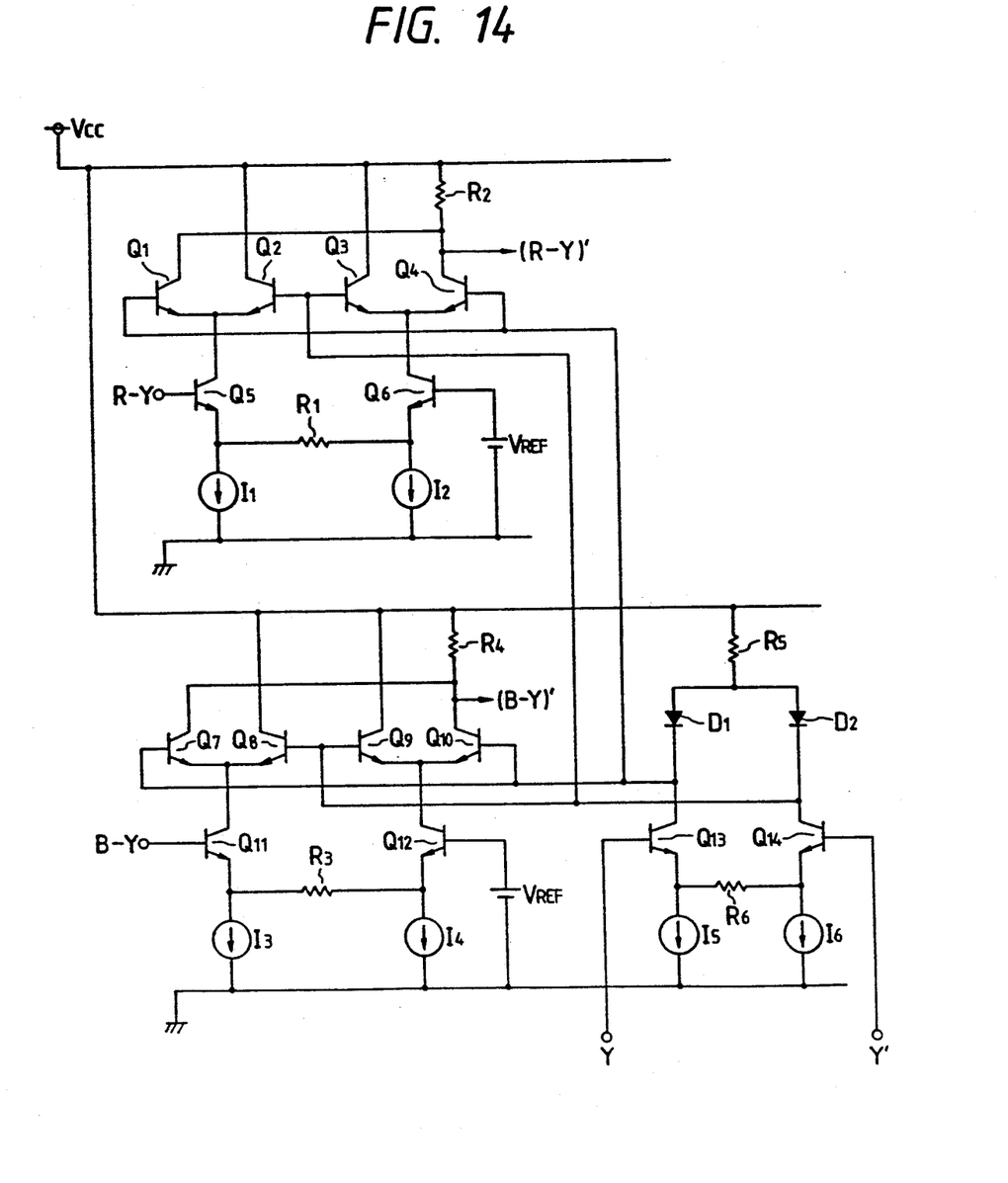
FIG. 14 is a circuit diagram illustrating in detail the essential portion of the circuit shown in FIG. 13.

FIG. 14 shows a more specific circuit configuration the variable amplifiers 36 and 37 and gain control circuit 38. The portion of the circuit shown in FIG. 14 which corresponds to variable amplifier 36 consists of the following components: NPN transistors $Q_1$, $Q_2$, $Q_3$ and $Q_4$ which make up two differential pairs; NPN transistor $Q_5$ connected to the junction between the emitters of the pair of $Q_1$ and $Q_2$; NPN transistor $Q_6$ connected to the junction between the emitters of the pair of $Q_3$ and $Q_4$; constant current source $I_1$ inserted between the emitter electrode of transistor $Q_5$ and ground potential; constant current source $I_2$ inserted between the emitter electrode of transistor $Q_6$ and ground potential; resistor $R_1$ connected between the emitter electrodes of $Q_5$ and $Q_6$; load resistor $R_2$ connected between the collector electrode of transistor $Q_4$ and a supply terminal Vcc; and a reference voltage source $V_{REF}$ which applies a predetermined dc voltage to the base electrode of transistor $Q_6$. The emitter electrodes of transistors $Q_1$ and $Q_2$, which form a differential pair, are connected to ground potential via the collector-emitter path of transistor $Q_5$ and the constant current source $I_1$. The emitter electrodes of transistors $Q_3$ and $Q_4$, which form another differential pair, are connected to ground potential via the collector-emitter path of transistor $Q_6$ and the constant current source $I_2$. The emitter electrodes of transistors Q$_5$ and Q$_6$ are connected by resistor R$_1$. Color difference signal R-Y from the matrix circuit is applied to the base electrode of transistor Q$_5$. The base electrodes of transistors Q$_1$ and Q$_4$ are connected at a common point. The base electrodes of transistors Q$_2$ and Q$_3$ are also connected at a common point. The collector electrodes of transistors Q$_1$ and Q$_4$ are connected at a common point where the corrected color difference signal (R-Y)' will appear.

The portion of the circuit shown in FIG. 14 which corresponds to variable amplifier 37 consists of the following components: NPN transistors Q$_7$, Q$_8$, Q$_9$ and Q$_{10}$ which make up two differential pairs; NPN transistor Q$_{11}$ connected to the junction between the emitters Q$_7$/Q$_8$ pair; NPN transistor Q$_{12}$ connected to the junction between the emitters of Q$_9$/Q$_{10}$ pair; constant current source I$_3$ inserted between the emitter electrode of transistor Q$_{11}$ and ground potential; constant current source I$_4$ connected between the emitter electrode of transistor Q$_{12}$ and ground potential; resistor R$_3$ connected between the emitter electrodes of Q$_{11}$ and Q$_{12}$; load resistor R$_4$ connected between the collector electrode of transistor Q$_{10}$ and a supply terminal Vcc; and a reference voltage source V$_{REF}$ which applies a predetermined dc voltage to the base electrode of transistor Q$_{12}$. The emitter electrodes of transistors Q$_7$ and Q$_8$, which form a differential pair, are connected to ground potential via the collector-emitter path of transistor Q$_{11}$ and the constant current source I$_3$. The emitter electrodes of transistors Q$_9$ and Q$_{10}$, which form another differential pair, are connected to ground potential via the collector-emitter path of transistor Q$_{12}$ and the constant current source I$_4$. The emitter electrodes of transistors Q$_{11}$ and Q$_{12}$ and are connected by resistor R$_3$. Color difference signal B-Y from the matrix circuit is applied to the base electrode of transistor Q$_{11}$. The base electrodes of transistors Q$_7$ and Q$_{10}$ are connected at a common point. The base electrodes of transistors Q$_8$ and Q$_9$ are also connected at a common point. The collector electrodes of transistors Q$_7$ and Q$_{10}$ are connected at a common point where the corrected color difference signal (B-Y)' will appear.

The portion of the circuit of FIG. 14 which corresponds to gain control circuit 38 shown in FIG. 13 consists of the following components: NPN transistor Q$_{13}$ and Q$_{14}$ which are connected at their emitter electrodes via a resistor R$_6$; a constant current source I$_5$ connected between the emitter electrode of transistor Q$_{13}$ and ground potential; a constant current source I$_6$ connected between the emitter electrode of transistor Q$_{14}$ and ground potential; a diode D$_1$ by which the collector electrode of transistor Q$_{13}$ is connected to supply terminal Vcc via resistor R$_5$; and diode D$_2$ by which the collector electrode of transistor Q$_{14}$ is connected to supply terminal Vcc via resistor R$_5$. Luminance signal Y from the matrix circuit is applied to the base electrode of transistor Q$_{13}$ and luminance signal Y' generated in the luminance correcting circuit 35 is applied to the base electrode of transistor Q$_{14}$. The junction between diode D$_1$ and transistor Q$_{13}$ is connected both to the base electrodes of transistors Q$_1$ and Q$_4$ and to the base electrodes of transistors Q$_7$ and Q$_{10}$. The junction between diode D$_2$ and transistor Q$_{14}$ is connected both to the base electrodes of transistors Q$_2$ and Q$_3$ and to the base electrodes of transistors Q$_8$ and Q$_9$.

Variable amplifier circuits 36 and 37 and gain control circuit 38 used in this embodiment operate as follows. Referring to FIG. 14, if the luminance signal Y applied to the base electrode of transistor Q$_{13}$ is equal in amplitude to the new luminance signal Y' applied to the base electrode of transistor Q$_{14}$, that is, in the period when luminance correcting circuit 35 does not effect nonlinear amplification, the collector currents of the two transistors are equal, so the base bias becomes the same for all transistors Q$_1$, Q$_2$, Q$_3$, Q$_4$, Q$_7$, Q$_8$, Q$_9$ and Q$_{10}$. Thus, the input color difference signals R-Y and B-Y will be produced from variable amplifiers 36 and 37 without nonlinear amplification.

If the amplitudes of luminance signal Y and new luminance signal Y' are not equal, or in other words, if Y' $\geq$ Y as shown in FIG. 4 or FIG. 9(d), an error current I proportional to the voltage different between Y' and Y will develop at the collectors of transistors Q$_{13}$ and Q$_{14}$ and the base bias on transistors Q$_1$, Q$_4$, Q$_7$ and Q$_{10}$ becomes higher than that on transistors Q$_2$, Q$_3$, Q$_8$ and Q$_9$, with color difference signals R-Y and B-Y being amplified by the corresponding degree. The factor of this amplification will change with the nonlinear change in the amplitude of the new luminance signal Y' with respect to luminance signal Y and hence both color difference signals R-Y and B-Y will be converted in accordance with the same nonlinear characteristic as for luminance signal Y.

As described above, in this further embodiment of the present invention, the color difference signals are corrected in synchronism with the period of correction of the luminance signal and in accordance with the same nonlinear characteristic, and this enables color correction to be performed with higher precision than when fixed amplifiers are used as in the second embodiment. If color signals are amplified with fixed amplification factors, non-white areas will become dark and impair their chroma; however, this problem can be avoided by using variable amplifiers as in this embodiment.

The invention thus being described, it will be obvious that the same may be varied in many ways. The foregoing description of the embodiments of the present invention assumes the use of R, G and B color filters, however the present invention is by no means limited to this particular case and any means that generates color signals for forming a luminance signal Y may be employed. The foregoing description also assumes that the input-output characteristic curve has only one kinking point as shown in FIG. 9(a). Needless to say, the use of more than one kinking point will contribute to further improvements in the characteristics of luminance correction. Moreover, approximation by kinking points to obtain a nonlinear input-output characteristic offers the advantage of great simplicity in circuit configuration. While the system can be composed of discrete circuits, it may also be composed of integrated circuits in order to realize a compact implementation. Such variations are not to be regarded as a departure from the spirit and scope of the invention, and all such modifications as would be obvious to one skilled in the art are intended to be included within the scope of the following claims.

What is claimed is:

1. An imaging apparatus which develops a corrected luminance signal and color difference signals of an image subject comprising:
   optical lens means for receiving image light emitted from said image subject in order to provide received image light;
   color filter means, coupled to said optical lens means, for filtering said received image light;

photo-electric conversion means, coupled to said color filter means, for converting the filtered image light into electrical image signals;

pre-amplifier means, coupled to said photo-electric conversion means, for amplifying said electrical image signals;

color separator means, coupled to said pre-amplifier means, for separating said amplified electrical image signals into red, green and blue color signals;

white balance adjustment means, coupled to said color separator means, for adjusting the amplitude levels of said red, green and blue color signals;

matrix circuit means, coupled to said white balance adjustment means, for converting said amplitude adjusted red, green and blue color signals into a luminance signal and color difference signals;

luminance signal correction means, coupled to said matrix circuit means, for outputting a corrected luminance signal in accordance with an input-output non-linear amplification factor in response to an input luminance signal intermediate a minimum and maximum luminance level, corresponding to a darkest and lightest luminance state, respectively, and for outputting said minimum and maximum luminance levels in response to an input luminance signal corresponding to said darkest and lightest state, respectively, in order to extend and emphasize an intermediate input luminance signal; and color difference correcting means, having fixed amplification factors, coupled to said matrix circuit means, for outputting corrected color difference signals that are subject to signal extension.

2. The imaging apparatus of claim 1, wherein said luminance signal correction means comprises:

attenuating means, coupled to said matrix circuit means, for attenuating the amplitude of an input luminance signal by a predetermined factor in order to output an attenuated luminance signal;

non-linear amplifying means, coupled to said attenuating means, for amplifying said attenuated luminance signal by a preset amplification factor to provide a non-linearly amplified luminance signal;

inverter means, coupled to said non-linear amplifying means, for inverting said non-linearly amplified luminance signal;

first adder means, coupled to said matrix circuit and said inverter means, for adding said input luminance signal and said inverted non-linearly amplified luminance signal to provide a first added output; and second adder means, coupled to said circuit means and said first adder means, for adding said input luminance signal and said first added output, to provide said corrected luminance signal as an output.

3. The imaging apparatus of claim 2, wherein said attenuating means attenuates said input luminance signal by a predetermined factor $1/k_1$ and said non-linear amplifying means amplifies an attenuated luminance signal corresponding to an input luminance signal of said minimum and maximum luminance levels by a factor of $k_1$ and an intermediate input luminance signal by a factor less than $k_1$.

4. A luminance signal correcting circuit for developing a corrected luminance signal extended and emphasized in an intermediate portion between a preset minimum luminance level and a preset maximum luminance level, corresponding to a darkest and lightest luminance state respectively, of an input-output non-linear amplification characteristic comprising:

attenuating means for attenuating the amplitude of an input luminance signal by a predetermined factor to output an attenuated luminance signal;

non-linear amplifying means, coupled to said attenuating means, for amplifying said attenuated luminance signal according to a predetermined amplification factor to output a non-linear amplified luminance signal;

inverter means, coupled to said non-linear amplifying means, for inverting said non-linear amplified luminance signal to output an inverted luminance signal;

first adder means, coupled to said inverter means, for adding said input luminance signal and said inverted luminance signal to output a first added signal; and second adder means, coupled to said first adder means, for adding said input luminance signal and said first added signal to output said corrected luminance signal.

5. The luminance signal correcting circuit of claim 4, wherein said attenuating means attenuates said luminance signal by a predetermined factor $1/k_1$ and said non-linear amplifying means amplifies an attenuated luminance signal corresponding to an input luminance signal of said preset minimum and preset maximum luminance levels by a factor of $k_1$ and an input luminance signal intermediate said preset minimum and preset maximum luminance levels by a factor less than $k_1$.

6. A luminance signal correcting circuit for developing a corrected luminance signal extended and emphasized in an intermediate portion between a preset minimum luminance level and a preset maximum luminance level, corresponding to a darkest and lightest luminance state respectively, of an input-output non-linear amplification characteristic which includes a kinking point intermediate said preset minimum and maximum luminance levels below which said amplification characteristic has a primary gain and above which said amplification characteristic has a secondary gain different from said primary gain, said luminance signal correcting circuit comprising:

corrector means, coupled to an input luminance signal, for changing the kinking point of said amplification characteristic in accordance with a first control signal to provide an amplification corrected luminance signal;

level shifting means, coupled to said corrector means, for changing a dc bias point of said amplification characteristic in accordance with a second control signal to provide a shifted luminance signal; and high-level selecting means, coupled to said level shifting means, for comparing said input luminance signal and said shifted luminance signal and for outputting the signal of higher level as said corrected luminance signal.

7. The luminance signal correcting circuit of claim 6 wherein said amplification characteristic includes plural kinking points and gains.

8. A method of developing a corrected luminance signal in an imaging process comprising the steps of:

attenuating the amplitude of an input luminance signal by a predetermined attenuation factor in order to provide an attenuated luminance signal;

amplifying said attenuated luminance signal non-linearly according to a predetermined amplification factor in order to provide a non-linear amplified luminance signal;

inverting said non-linear amplified luminance signal in order to provide an inverted luminance signal;

adding said input luminance signal and said inverted luminance signal to provide a first added signal; and adding said input luminance signal and said first added signal to provide said corrected luminance signal extended and emphasized in an intermediate portion between a preset minimum and maximum luminance level of an input-output non-linear amplification characteristic and restricted in black and white luminance levels thereof to provide enhanced image quality irrespective of whether an imaging scene is backlighted or spotlighted.

9. The imaging method of claim 8, wherein said predetermined attenuation factor of said attenuating step is $1/k_1$ and wherein an attenuated luminance signal corresponding to an input luminance signal of said preset minimum and maximum luminance levels is amplified by a predetermined amplification factor of $k_1$ in said amplifying step and an attenuated luminance signal corresponding to an input luminance signal intermediate said preset minimum and maximum luminance levels is amplified by a factor less than $k_1$.

10. An imaging method for providing a corrected luminance signal extended and emphasized in an intermediate portion between a preset minimum luminance level and a preset maximum luminance level, corresponding to a darkest and lightest luminance state respectively, of an input-output non-linear amplification characteristic which includes a kinking point intermediate said preset minimum and maximum luminance levels below which said amplification characteristic has a primary gain and above which said amplification characteristic has a secondary gain different from said primary gain, said imaging method comprising the steps of:

changing the kinking point of said amplification characteristic in accordance with a first control signal and amplifying said input luminance signal accordingly to provide an amplification corrected luminance signal;

level shifting said amplification corrected luminance signal to change a dc bias point of said amplification characteristic in accordance with a second control signal to provide a shifted luminance signal;

comparing said input luminance signal and said shifted luminance signal in order to select the signal of higher level; and outputting said signal of higher level as said corrected luminance signal.

11. The imaging method of claim 10, wherein said amplification characteristic has plural kinking points and gains.

12. An image quality correcting system for use with an imaging apparatus which includes a matrix circuit for forming a luminance signal and color difference signals from color signals generated in an imaging device, comprising:

luminance signal correcting means for producing with the same linear input-output characteristic an output in response to a luminance signal input for a preset minimum luminance and another output in response to a luminance signal input for a preset maximum luminance and for producing an output in response to a luminance signal input within limits of said preset minimum and maximum luminance levels in accordance with an appropriate nonlinear input-output characteristic having a greater amplification factor than said linear input-output characteristic; and color difference correcting means for amplifying said color difference signals by an appropriate amplification factor, at least a new luminance signal being generated for the luminance signal formed in the matrix circuit, said new luminance signal being nonlinearly extended with the limits of said preset minimum and maximum luminance levels, and new color difference signals being generated by amplification with said appropriate amplification factor.

13. The image quality correcting system according to claim 12, wherein said appropriate amplification factor of said color difference correcting means is varied in accordance with said nonlinear input-output characteristic.

14. A method of image quality correction for use with an imaging apparatus comprising:

generating a luminance signal from color signals generated in an imaging device, at least two outputs being generated with the same linear input-output characteristic in response to a luminance signal input for a preset minimum luminance and to a luminance signal input for a preset maximum luminance, and for generating an output in response to a luminance signal input within limits of said preset minimum and maximum luminance levels in accordance with an appropriate nonlinear input-output characteristic having a greater amplification factor than said linear input-output characteristic, thereby extending a luminance signal within the limits of said preset minimum and maximum luminance levels;

changing a position of a kinking point of said nonlinear input-output characteristic which extends along an approximation curve to change an amplification factor thereof, to generate a new luminance signal having said preset nonlinear input-output characteristic; and comparing in high-level selecting means an amplitude of the new luminance signal with the input luminance signal to selectively output the signal of higher amplitude level.

15. An image quality correcting system for use with an imaging apparatus comprising:

matrix means for forming a luminance signal from color signals obtained by an imaging device; and luminance signal correcting means for producing with the same linear input-output characteristic an output in response to an input luminance signal for a preset minimum luminance and another output in response to an input luminance signal for a preset maximum luminance and for producing an output in response to an input luminance signal within limits of said preset minimum and maximum luminance levels in accordance with an appropriate nonlinear input-output characteristic having a greater amplification factor than said linear input-output characteristic, thereby extending a luminance signal within the limits of said preset minimum and maximum luminance levels, said luminance signal formed in said matrix circuit being supplied to said luminance signal correcting means as said input luminance signal to generate a nonlinearly amplified luminance signal, said luminance signal correcting means comprising first means, coupled to said matrix means, for amplifying and inverting said input luminance signal to generate a first output signal in which amplitude levels of minimum and maximum levels are equal to said preset minimum and maximum levels and wherein amplitude levels therebetween are non-linearly amplified, first adder means, coupled to said matrix means and said first means, for adding said input luminance signal to said first output signal to generate a first added signal, and second adder means, coupled to said matrix means and said first adder means, for adding said input luminance signal to said first added signal to generate said non-linearly amplified luminance signal.

16. An imaging apparatus which develops a corrected luminance signal and color difference signals of an image subject comprising:

optical lens means for receiving image light emitted from said image subject in order to provide received image light;

color filter means, coupled to said optical lens means, for filtering said received image light;

photo-electric conversion means, coupled to said color filter means, for converting the filtered image light into electrical image signals;

pre-amplifier means, coupled to said photo-electric conversion means, for amplifying said electrical image signals;

color separator means, coupled to said pre-amplifier means, for separating said amplified electrical image signals into red, green and blue color signals;

white balance adjustment means, coupled to said color separator means, for adjusting the amplitude levels of said red, green and blue color signals;

matrix circuit means, coupled to said white balance adjustment means, for converting said amplitude adjusted red, green and blue color signals into a luminance signal and color difference signals; and luminance signal correction means, coupled to said matrix circuit means, for outputting a corrected luminance signal in accordance with an input-output non-linear amplification factor in response to an input luminance signal intermediate a minimum and maximum luminance level, corresponding to a darkest and lightest luminance state, respectively, and for outputting said minimum and maximum luminance levels in response to an input luminance signal corresponding to said darkest and lightest state, respectively, in order to extend and emphasize an intermediate input luminance signal, said input-output non-linear amplification factor having plural kinking points intermediate said minimum and maximum luminance levels, below which said amplification factor has primary gains and above which has secondary gains which are unequal.

17. The imaging apparatus of claim 16, wherein said luminance signal correction means comprises:

corrector means, coupled to said matrix circuit means, for changing the kinking point of said amplification factor in accordance with a first control signal to provide an amplification corrected luminance signal;

level shifting means, coupled to said corrector means, for changing a dc bias point of said amplification corrected luminance signal, in accordance with a second control signal, to provide a shifted luminance signal; and high-level selecting means, coupled to said matrix circuit means and said level shifting means, for comparing said input luminance signal and said shifted luminance signal and for outputting the signal with a higher level as said corrected luminance signal.

18. The imaging apparatus of claim 16, further comprising:

variable-gain amplifier means, coupled to said matrix circuit means, for non-linearly amplifying the color difference signals; and gain control means, coupled to said matrix circuit means, said luminance signal correction means and said variable-gain amplifier means, for detecting the time at which said luminance signal correction means performs non-linear amplification on said input luminance signal and for controlling said variable-gain amplifier means to perform non-linear amplification on said color difference signals at that time.

* * * * *